No. 723,435. PATENTED MAR. 24, 1903.
W. S. BARKER.
FENCE POST.
APPLICATION FILED JULY 3, 1901.
NO MODEL.

WITNESSES.
Frank Kaufman.
Urban C. Jacobs.

INVENTOR
William Seward Barker
BY
Hale Koehne
HIS ATTY.

UNITED STATES PATENT OFFICE.

WILLIAM SEWARD BARKER, OF DAYTON, OHIO.

FENCE-POST.

SPECIFICATION forming part of Letters Patent No. 723,435, dated March 24, 1903.

Application filed July 3, 1901. Serial No. 66,957. (No model.)

*To all whom it may concern:*

Be it known that I, WILLIAM SEWARD BARKER, a citizen of the United States, residing at Dayton, Montgomery county, Ohio, have invented a new and useful Fence-Post, of which the following is a specification, reference being had to the accompanying drawings, forming part thereof, in which drawings like characters of reference indicate the same parts.

My invention relates to improved means for attaching the fence-body to the fence-posts.

Figure 1:
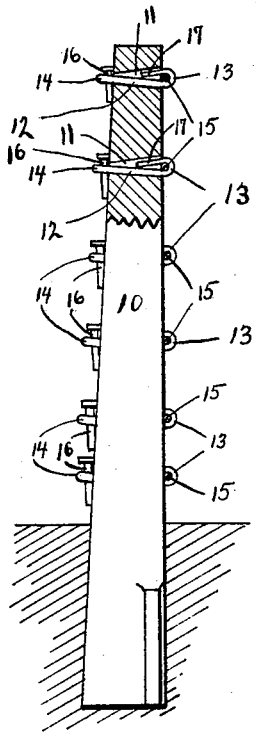
Figure 2:
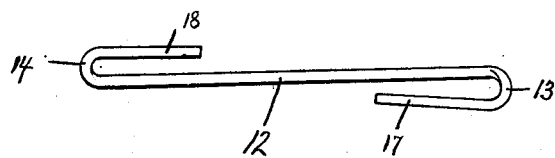

Figure 1 is a side elevation view of a fence-post, showing the fence-wires or fence-body in cross-section and said attaching means, the upper part of said post being in central vertical section to more clearly show said attaching means; and Fig. 2 is an enlarged perspective view of one of the attaching-links.

In said drawings, 10 represents one of the posts, which is provided with a plurality of openings 11 therethrough at substantially right angles to the height of said post. Through said openings 11 pass links 12, preferably formed of wire and having hooks 13 and 14 formed on opposite ends of each of said links 12, each of said hooks 13 and 14 being turned at substantially right angles to each other, the hook 13 clasping the fence-wires 15 against one face of the post 10 and is held in such position by a wedge or wedge-shaped nail 16 passing through each of the hooks 14 and binding against the opposite face of the post 10. The tighter said wedges 16 are driven the tighter said hooks 13 clamp the fence-wire 15. Each of said hooks 13 and 14 are respectively provided with relatively long ends 17 and 18, extending toward the center of said links 12, and which ends 17 and 18 project into said openings 11, so that said hooks 13 and 14 cannot become straightened by rubbing contact with the fence, as would be possible where the ends of said hooks 13 and 14 terminated at a point outside the post.

The post may be of any desirable material, although I prefer to make the same of artificial stone, cement, or other molded plastic material.

Having now fully described my invention, what I claim, and desire to secure by Letters Patent, is—

The combination of a fence-post having a plurality of openings therethrough, a link passing through each of said openings, a hook on the opposite ends of each of said links, said hooks projecting beyond the fence-post, fence-wires embraced by said hooks projecting from one side of the post, wedges in said hooks projecting from the opposite side of said fence-post for binding said fence-wire to said post, said hooks upon opposite ends of said links being provided with relatively long end projections extending from opposite sides into said openings through said post and terminating within the body of said post, substantially as specified.

In testimony whereof I have signed my name to this specification, this 1st day of July, 1901, in presence of two subscribing witnesses.

WILLIAM SEWARD BARKER.

Witnesses:
L. D. HELLER,
U. C. JACOBS.